United States Patent
Scott et al.

(10) Patent No.: US 9,875,000 B2
(45) Date of Patent: *Jan. 23, 2018

(54) METHOD AND APPARATUS FOR PRESENTING MEDIA CONTENT

(71) Applicant: AT&T INTELLECTUAL PROPERTY I, LP, Atlanta, GA (US)

(72) Inventors: Charles V. Scott, Austin, TX (US); James Cansler, Pflugerville, TX (US); Scott White, Austin, TX (US)

(73) Assignee: AT&T Intellectual Property I, LP., Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/144,947

(22) Filed: May 3, 2016

(65) Prior Publication Data

US 2016/0246461 A1    Aug. 25, 2016

Related U.S. Application Data

(63) Continuation of application No. 14/223,879, filed on Mar. 24, 2014, now Pat. No. 9,360,999, which is a continuation of application No. 12/623,350, filed on Nov. 20, 2009, now Pat. No. 8,719,867.

(51) Int. Cl.
| | |
|---|---|
| *H04N 5/445* | (2011.01) |
| *G06F 3/00* | (2006.01) |
| *G06F 3/048* | (2013.01) |
| *G06F 13/00* | (2006.01) |
| *G06F 3/0482* | (2013.01) |
| *H04N 21/262* | (2011.01) |
| *H04N 21/482* | (2011.01) |
| *H04N 21/84* | (2011.01) |
| *H04N 21/47* | (2011.01) |
| *H04N 21/472* | (2011.01) |

(Continued)

(52) U.S. Cl.
CPC ........ *G06F 3/0482* (2013.01); *G06F 3/04817* (2013.01); *G06F 3/04842* (2013.01); *H04N 21/26258* (2013.01); *H04N 21/47* (2013.01); *H04N 21/47217* (2013.01); *H04N 21/4825* (2013.01); *H04N 21/84* (2013.01); *G06F 3/048* (2013.01)

(58) Field of Classification Search
None
See application file for complete search history.

(56) References Cited

U.S. PATENT DOCUMENTS

| | | |
|---|---|---|
| 6,950,989 B2 | 9/2005 | Rosenzweig |
| 6,987,221 B2 | 1/2006 | Platt |
| 6,993,592 B2 | 1/2006 | Krumm |

(Continued)

*Primary Examiner* — James R Marandi
(74) *Attorney, Agent, or Firm* — Guntin & Gust, PLC; Matthew Tropper

(57) ABSTRACT

A method that incorporates teachings of the present disclosure may include, for example, receiving a selection from a media device corresponding to a first media content, generating a play list at a server where the play list includes second media content that is associated with the first media content by at least one of genre, artist and being published in temporal proximity, and providing play list content comprising at least a portion of the first and second media content to the media device, where at least one of the generation of the play list and the providing of the play list content is based on metadata pointers associated with the first and second media content. Other embodiments are disclosed.

20 Claims, 6 Drawing Sheets

(51) Int. Cl.
*G06F 3/0481* (2013.01)
*G06F 3/0484* (2013.01)

(56) References Cited

U.S. PATENT DOCUMENTS

| | | |
|---|---|---|
| 7,136,875 B2 | 11/2006 | Anderson |
| 7,680,824 B2 | 3/2010 | Plastina et al. |
| 2003/0135513 A1 | 7/2003 | Quinn |
| 2004/0131333 A1 | 7/2004 | Fung |
| 2004/0252604 A1 | 12/2004 | Johnson |
| 2006/0253874 A1 | 11/2006 | Stark et al. |
| 2007/0122118 A1 | 5/2007 | Seo |
| 2008/0059989 A1 | 3/2008 | O'Connor et al. |
| 2008/0194175 A1 | 8/2008 | Last |
| 2009/0063975 A1 | 3/2009 | Bull et al. |
| 2009/0150445 A1 | 6/2009 | Herberger et al. |
| 2010/0125882 A1 | 5/2010 | Athias |
| 2010/0251304 A1 | 9/2010 | Donoghue et al. |

400

500

METHOD AND APPARATUS FOR PRESENTING MEDIA CONTENT

CROSS-REFERENCE TO RELATED APPLICATIONS

This application is a continuation of U.S. patent application Ser. No. 14/223,879 filed Mar. 24, 2014, which is a continuation of U.S. patent application Ser. No. 12/623,350 filed Nov. 20, 2009 (now U.S. Pat. No. 8,719,867), each of which is incorporated by reference herein in its entirety.

FIELD OF THE DISCLOSURE

The present disclosure relates generally to the presentation of media content and more specifically to a method and apparatus for presenting media content.

BACKGROUND OF THE DISCLOSURE

Users often desire to listen to, or view, a variety of media content, particularly over extended periods of time such as during traveling. Achieving a desired variety for a particular viewer is a difficult task and can result in users switching between broadcasts, such as radio or television channels. Over extended periods of time, users often attempt to personalize the media content, such as shuffling a variety of songs from different artists.

DETAILED DESCRIPTION OF THE DRAWINGS

One embodiment of the present disclosure can entail a media device comprising a controller to receive a selection of a first media content, present icons representative of one or more second media content where the second media content was published in temporal proximity to the first media content, obtain a play list based on at least a portion of the first and second media content, and retrieve play list content corresponding to the play list from a media content source, where the play list content is located using one or more metadata pointers associated with at least one of the first and second media content, and the media content source is remote from the media device and in communication with the media device over a network.

Another embodiment of the present disclosure can entail a method including receiving a selection from a media device corresponding to a first media content, generating a play list comprising second media content where the second media content is associated with the first media content by at least one of genre, artist and being published in temporal proximity, and providing play list content comprising at least a portion of the first and second media content to the media device, where at least one of the generation of the play list and the providing of the play list content is based on metadata pointers associated with the first and second media content.

Yet another embodiment of the present disclosure can entail a server comprising a controller to receive a selection from a media device corresponding to a first media content, select a group of second media content where the first and second media content are associated with each other by at least one of genre, artist and being published in temporal proximity, generate a play list comprising at least a portion of the first and second media content, and provide play list content comprising at least a portion of the first and second media content to the media device, where at least one of the generation of the play list and the providing of the play list content is based on metadata pointers associated with the first and second media content.

Figure 1:
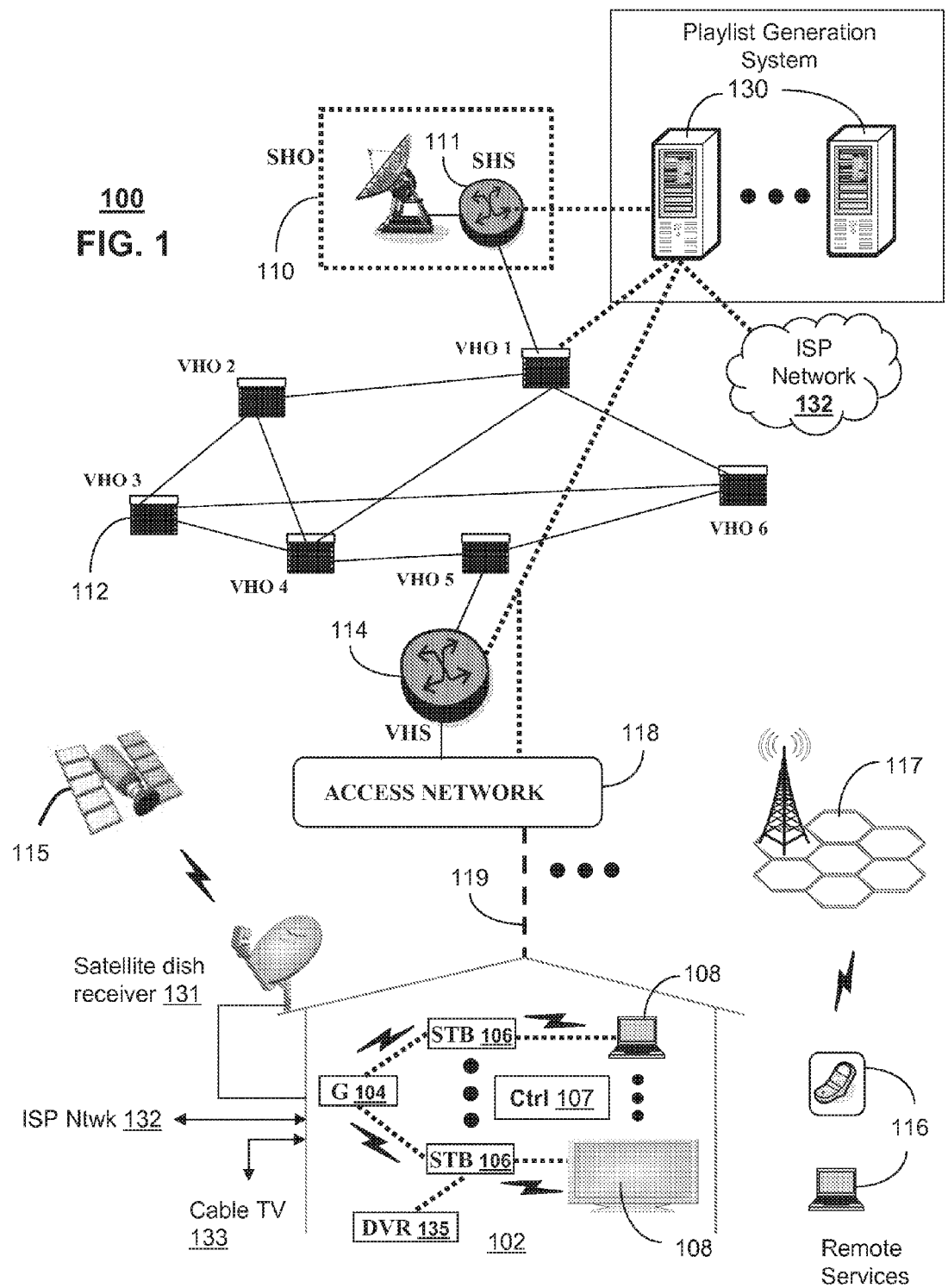
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a Digital Video Recorder (DVR) 135. The DVR 135 can be operably coupled to at least one of the STBs 106 and can be either a standalone device or integrated as part of a STB 106. Notably, the DVR 135 can be utilized to capture and store various types of media content to a disk/hard drive contained in the DVR 135. The media content can include audio content, text content, video content, still image content, and/or combinations thereof. A user can select content listed or otherwise displayed on media device 108 for transmission to another device of the user and/or to another device associated with another user. When the content is selected by the user, the STB 106 can store the selected content into the DVR 135 in preparation for transmission to the other device.

Another distinct portion of the computing devices 130 can function as a backend server (herein referred to as server 130). The server 130 can use common computing and communication technology to perform the function of generating playlists and/or locating media and distributing media content and/or other content among users utilizing the communication system 100. The server 130 can be operably coupled to communication devices throughout the network, including the DVR 135 and the STBs 106, via access network 118.

In one embodiment, the server 130 can store metadata pointers that are associated with media content to be presented by one or more communication or media devices such as the STBs 106. In another embodiment, the server 130 can receive metadata pointers from the communication devices such as the STBs 106. The metadata pointers can provide information for identifying and locating other media content associated with the selected media content that is presentable by the communication device such as STB 106. In one embodiment, the metadata pointers can point to data stored in a remote media content source, the DVR 136, and/or the STBs 106. The metadata pointers facilitate identification and location of other media content that is associated with selected media content so that a customized playlist and/or play stream can be generated for the user. The relationship between the media content can be of various forms, including being created around the same time period, (such as music from the 1950's), being of the same genre (such as country music) and being of the same artist.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services. In one embodiment, the communication system can employ an IP Multimedia Subsystem (IMS) network architecture to facilitate the combined services of circuit-switched and packet-switched systems.

Figure 2:
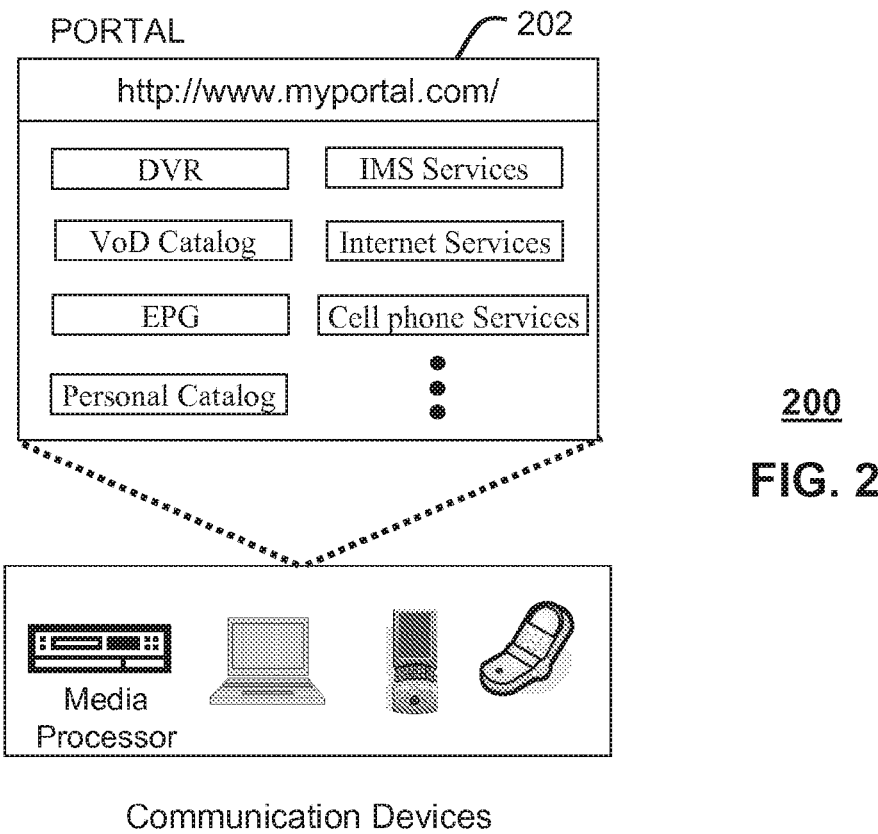
FIG. 2 depicts an illustrative embodiment of a portal interacting with the communication system of FIG. 1.

FIG. 2 depicts an illustrative embodiment of a portal 202 which can operate from the computing devices 130 described earlier in communication system 100 illustrated in FIG. 1. The portal 202 can be used for managing services of the communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a DVR, a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
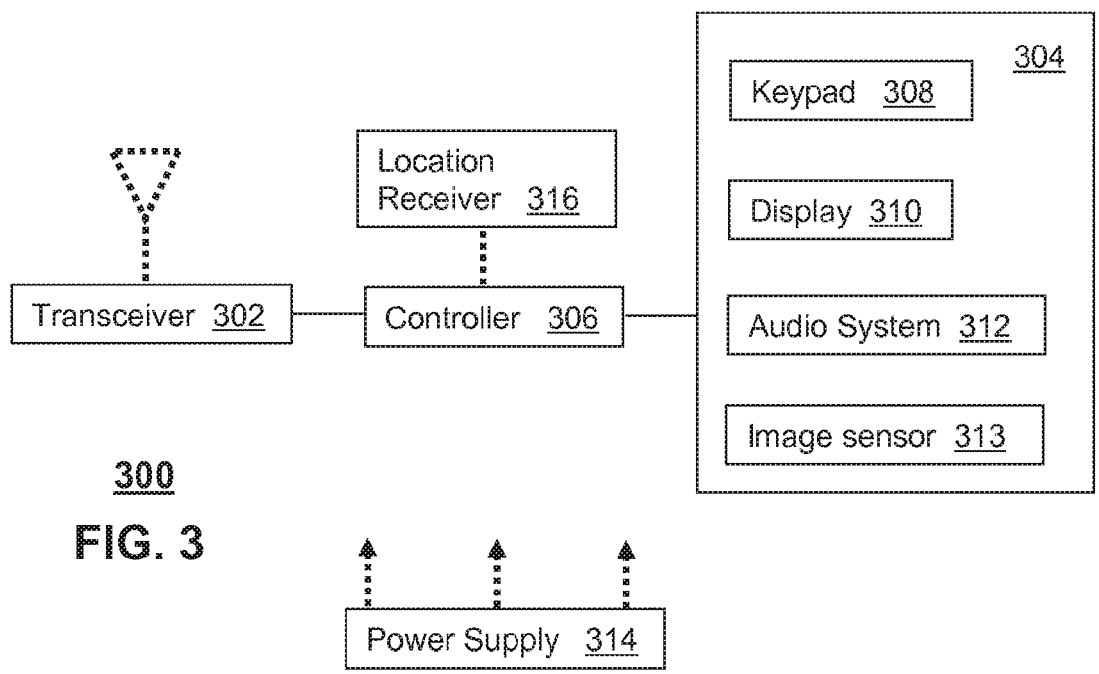
FIG. 3 depicts an illustrative embodiment of a communication device utilized in the communication system of FIG. 1.

FIG. 3 depicts an exemplary embodiment of a communication or media device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a QWERTY keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player. In one embodiment, the communication device 300 can generate a playlist or play stream of media content, including music, video, images and combinations thereof, which are customized for the user. For example, the communication device 300 can present a selection of other songs from the same time period as a song selected by the user. Other criteria can be used for presenting the selection of songs, including the same genre and/or artist. The communication device can utilize metadata pointers for identifying and/or locating the other media content. For instance, metadata pointers can be embedded in the media content and read by the communication device as to identification and location of other media content in the same time period, same artist and/or same genre.

Figure 4:
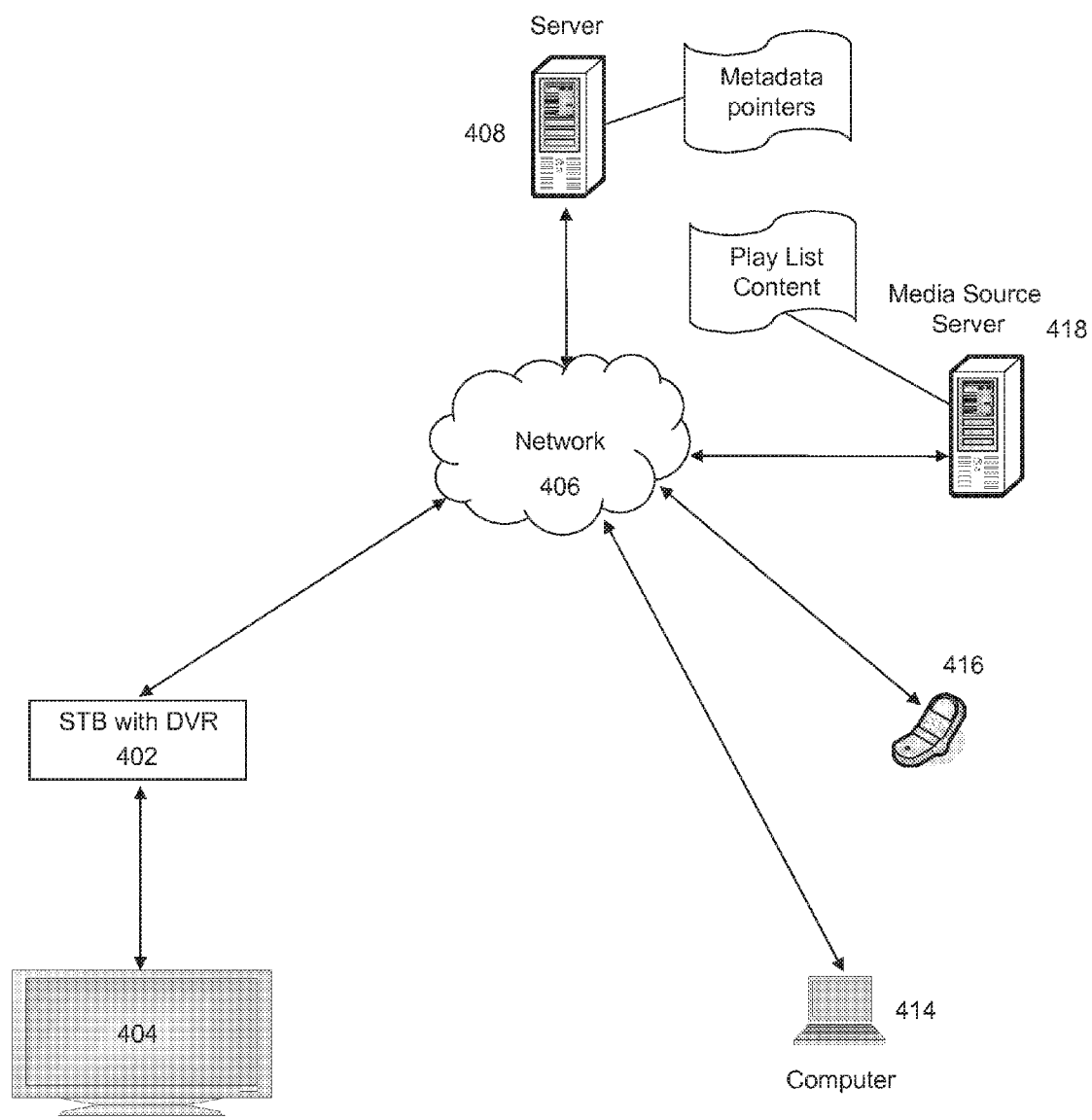
FIG. 4 depicts an illustrative embodiment of a system for presenting media content based on a playlist, the system operating in portions of the communication system of FIG. 1.

FIG. 4 depicts an illustrative embodiment of a system 400 for generating a playlist or play stream of media content. System 400 can be operably connected to or overlaid with system 100. System 400 can include an STB 402, which can be operably connected to a DVR or other content storage device, including an integrated DVR. The STB 402 can be operably coupled to a display device 404, which can be utilized to display various types of media content supplied to the STB 402 by a media content provider. The media content supplied by the media content provider can include audio content, text content, video content, video games, still image content, and/or combinations thereof.

The STB 402 can be operably coupled to a network 406, which can enable the STB 402 to access a server 408. In one embodiment, the server 408 can act as an intermediary between the STB 402 and the other devices and entities in the system 400. Additionally, the system 400 can include other communication devices such as a computing device 414 and a mobile device 416. In one embodiment, these additional devices can be operably coupled to STB 402 via the network 406, although the present disclosure contemplates one or more of these communication devices operating independently of and without communication with one or more other communication devices. The display device 404 can be monitors, televisions, and other display means. The computing device 414 can be desktop computers, laptops, tablet computers, personal digital assistants (PDA), or other computing devices. The mobile device 416 can be a cellular phone, PDA, mobile computer, or other mobile device. The devices in the system 400 can be configured to operate in various communication systems, including an interactive television (iTV) network, such as IPTV, interactive cable television, and interactive satellite television.

One or more of the communication devices can present a graphical user interface (GUI), such as a cursor controlled by a mouse or other actuating device, for interacting with media content that is presentable by the STB in order to generate a playlist or play stream. A user can utilize the GUI to request or otherwise select other media content associated with the media content that is to be presented by the communication device or is already being presented. For instance, a viewer can pass the cursor over an icon representing a first song that is being presented and a selection of other associated media content can be presented. This can be done using a variety of techniques including presenting a drop down menu in response to a right click of the mouse and/or presenting options for replacement content during a passover of the cursor with respect to the media content icon.

The communication devices can communicate with the server 408 to retrieve the other media content. The retrieval of the other media content can be based on the metadata pointers as described with respect to system 100. The metadata pointers can facilitate locating of the other media content, such as providing information as to a location of the content including a URL or URI. In one embodiment, the metadata pointers can be stored by the server 408. In another embodiment, the server 408 can retrieve the metadata pointers from the media content that is distributed to the communication devices.

For instance, the metadata pointers can be embedded in the media content and obtained by the server 408 during distribution. In one embodiment, the server 408 can obtain and store the media content during a first distribution of the media content, such as a movie, so that the server can access the metadata pointers for subsequent play list generation requests, such as a request being performed by a viewer who is watching the media content at a later time using his or her DVR. In another embodiment, the metadata pointers can be removed from the media content stream prior to distribution from the server 408 to the STB 402.

Upon receipt of a request or selection for generating a playlist of media content from the communication device, the server 408 can utilize the metadata pointers to locate and retrieve the content from a remote media content or source server 418. In one embodiment, the server 408 can send a content request to the source server 418 and receive the content in response to that request. The server 408 can then transmit the content to the communication device. In another embodiment, the source server 418 can be provided with instructions for forwarding the content to the communication device without having to transmit the content to the requesting server.

In one embodiment, a user utilizing the communication device can select a playlist or a portion thereof to be shared with other communication devices associated with the user so that the playlist becomes a group playlist. The user can specify which recipient device or devices are to receive the content. In one embodiment, once the user selects the playlist, the selected content can be stored in the other communication device. In another embodiment, the metadata pointer associated with the media content can be transmitted by the communication device to the server 408. The metadata pointer can correspond to a file name associated with the portion of the content, a location in the DVR, a uniform resource locator (URL), a uniform resource identifier (URI), and/or another identifier utilized for locating the media content that corresponds to the generated playlist. The server 408 can send a request to the specified recipient devices to accept the selected content. If the recipient device accepts the request, the metadata pointer can be stored at the server 408 (if not already stored) and the server can retrieve the content from the DVR or other storage device based on the metadata pointer. Once the server has retrieved the content, the server 408 can transmit the content to the recipient devices, which can then present the content as part of the playlist.

System 400 describes a distributed system where a customized playlist can be generated and the media content associated with the playlist can be retrieved from remote sources using metadata pointers. However, the present disclosure contemplates one or more of these techniques being used locally. For instance, all or a portion of the media content associated with the playlist can be retrieved from a memory device of the communication device.

Figure 5:
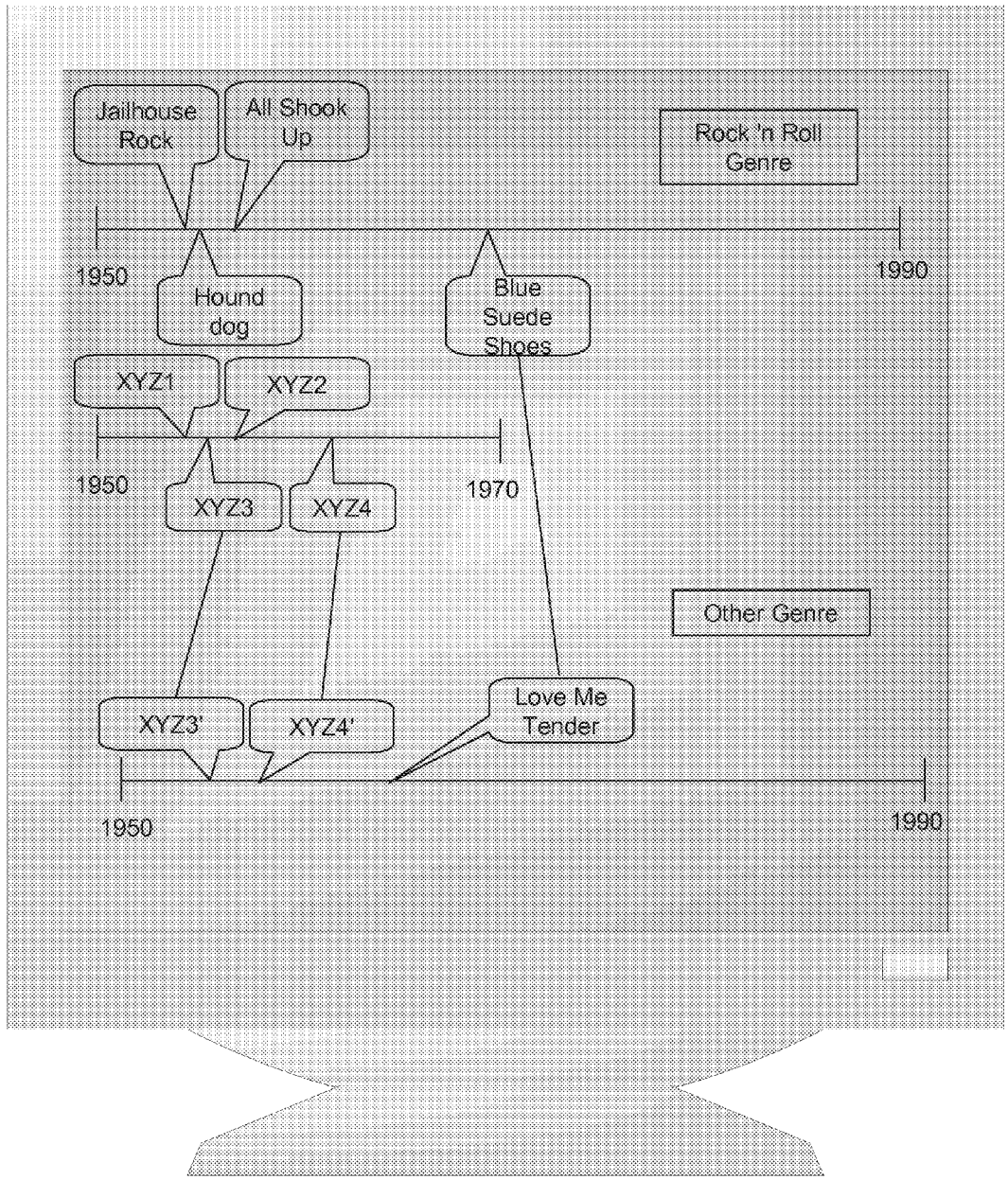
FIG. 5 depicts an illustrative embodiment of a graphical user interface that can be presented by the communication system of FIG. 1 and the system of FIG. 4.

FIG. 5 depicts an illustrative embodiment of a graphical user interface (GUI) 500 that can be utilized by one or more of the communication devices of systems 100 and 400. GUI 500 can present icons representative of media content which are displayed in relationship to time, genre and/or artist. For example, a first time line can be presented which shows songs by Elvis Presley which as mapped to the time frame when they were created. A second time line can be presented which shows songs in the same time frame and the same genre, but by different artists. A third time line can be presented which shows songs in a different genre but by the same artists as in the first and second time lines. In one embodiment, the icons representative of the media content (such as songs) can graphically show the relationship between each other, such as indicating the same artist in different genres using a line or the like. By mapping the media content based on a relationship among the media content, such as same genre, same time period (i.e., published in temporal proximity) and/or same artist, the user can more easily select desired media content for a playlist. In one embodiment, the GUI 500 can generate the various media content based on factors such as time period and then allow the user to selectively remove particular media content from the play stream. In this fashion, a play stream can be more efficiently generated.

Figure 6:
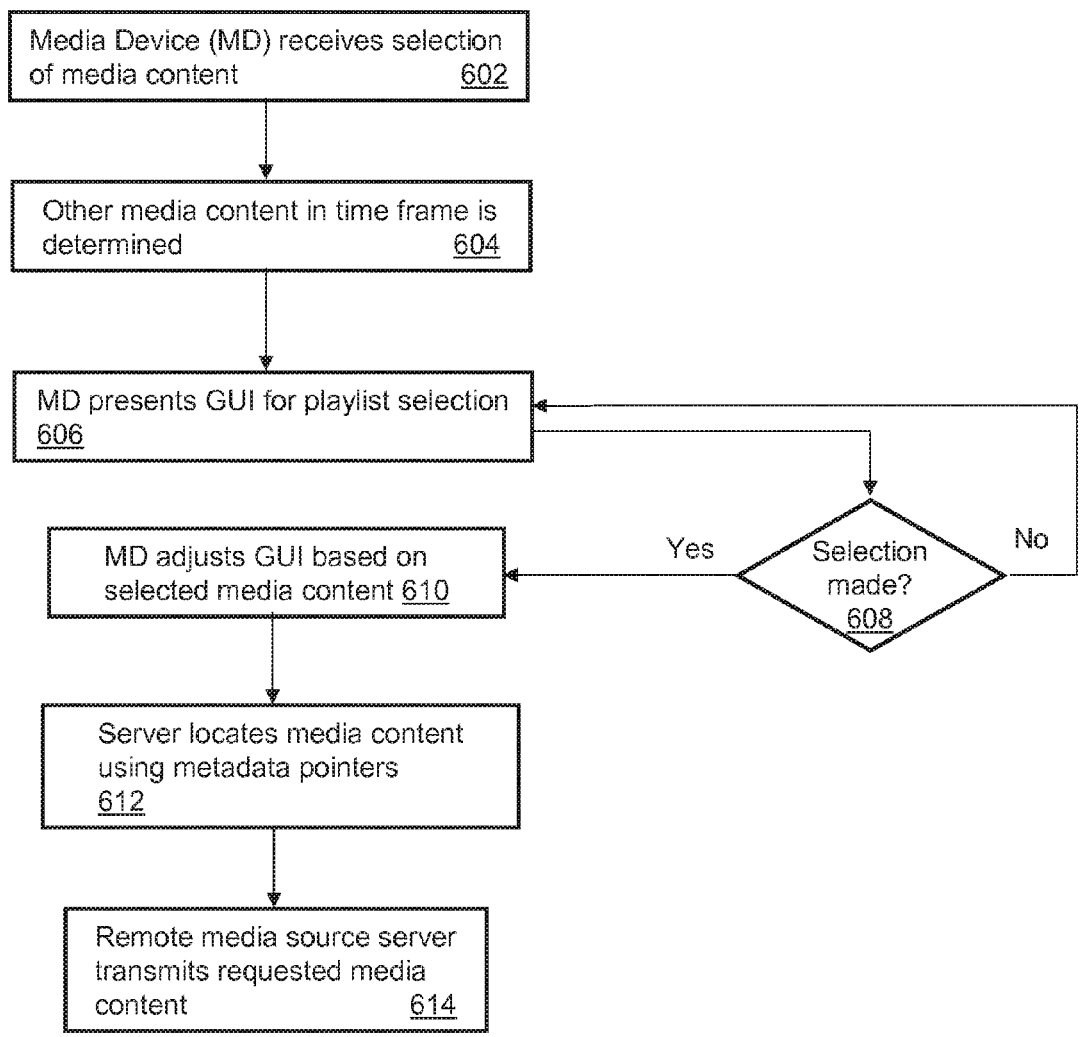
FIG. 6 depicts an illustrative embodiment of a method operating in portions of the communication system of FIG. 1 and the system of FIG. 4.

FIG. 6 depicts an illustrative method 600 operating in portions of communication systems 100 and 500. Method 600 can begin with step 602 in which a media or communication device, such as a mobile phone or STB, receives a selection of media content to be included in a playlist or play stream. In step 604, other media content that is associated with the selected media content can be determined For example, the other media content can be based on temporal proximity of creation, genre, artist and so forth. In step 606, the media device can present a GUI having the other media content that is associated with the selected media content. The GUI can utilize icons, including images of the artist, album cover and so forth. In one embodiment, the icon can comprise or can otherwise provide access to a sample of the media content, such as allowing for presenting a portion of the song or a clip from a movie.

In step 608, the user can make a selection of the media content for the play list. In one embodiment, the selection can be reviewing and approving the media content suggestions presented in the GUI. In another embodiment, the GUI can provide a list of the associated media content and the user can select various media content from the list. Other techniques for selecting the media content are also contemplated, such as the mapping process discussed above with respect to GUI 500.

In one embodiment in step 610, the GUI can be adjusted based on the selections of the media content being made. For example, if the user selects songs by the same artist in a single genre then the GUI can present icons of other artists in that same genre and time period. In step 612, the media content from the generated playlist can be located. For example, metadata pointers can be used to ascertain a location of the media content, such as a remote media source server. In one embodiment, a back-end server can utilize the metadata pointers for retrieving the media content, however, the present disclosure contemplates other devices retrieving the media content both with and without the assistance of the metadata pointers, such as the communication device retrieving the media content.

For instance, the metadata pointers can be stored on the server 408 and can include a URL or URI for retrieving the content from a remote media content source. In one embodiment, the metadata pointers can be provided to the server 408 by the media device, such as by accessing the metadata pointers that are embedded in the media content. After receiving the media content from the media source, including a remote media source, the server 408 can transmit the replacement content to the media device and/or to other media devices. In one embodiment, the media content can also be content that is dynamic in nature. Dynamic content can be content that is temporary in nature and/or can be scheduled content such as sporting events television shows, radio programs, scheduled movies, and the like.

In step 614, the play stream of media content can then be transmitted to the communication device for presentation.

Upon reviewing the aforementioned embodiments, it would be evident to an artisan with ordinary skill in the art that said embodiments can be modified, reduced, or enhanced without departing from the scope and spirit of the claims described below. For example, the playlist can be generated based on criteria which can be weighted by the user. For instance, a user may heavily weigh the time period of music but lightly weigh the artist so that a playlist is generated with numerous artists but within a specified time period.

As another example, the weighting function for the particular criteria, including the time period, can be determined automatically by one or more of the media device, the back end server or some other component. For instance, user behavior can be monitored and correlated to the particular criteria used for generating the play list, such as time period, genre and artist. A user who switches radio stations or plays songs which are from a particular time period can have that criteria more heavily weighted than a user who does not exhibit such behavior.

In one embodiment, the use of metadata pointers for locating the other media content can be selective. For instance, the metadata pointers can provide the location of several media content sources. A determination of which of the sources, and thus which of the metadata pointers, to be utilized can be made, such as by the server, the STB, the user and/or according to a user profile. The determination can be based on a number of factors such as reliability of the source, cost and so forth.

Other suitable modifications can be applied to the present disclosure without departing from the scope of the claims below. Accordingly, the reader is directed to the claims section for a fuller understanding of the breadth and scope of the present disclosure.

Figure 7:
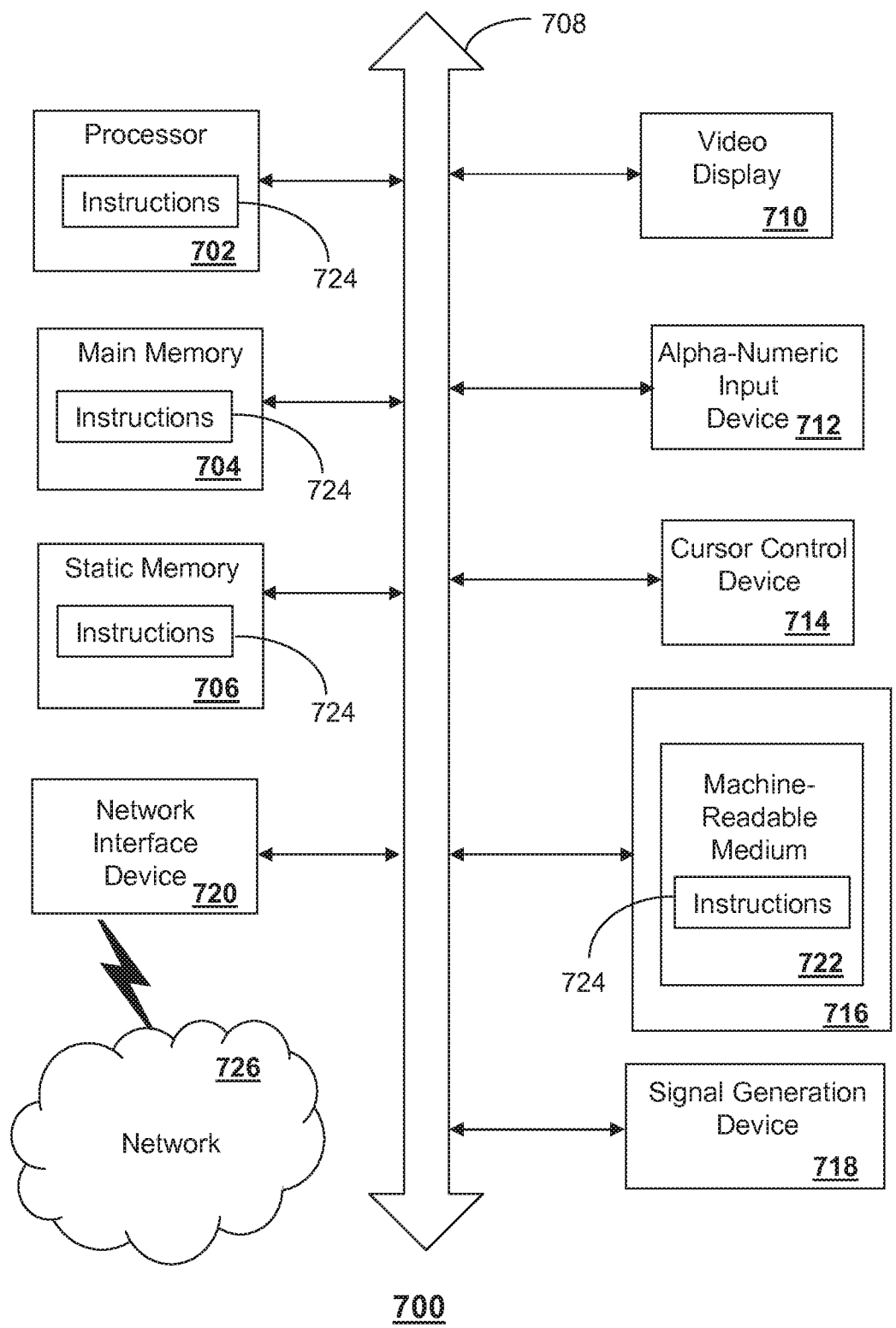
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 610 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media device, comprising:
   a processor; and
   a memory that stores executable instructions that, when executed by the processor, facilitate performance of operations, comprising:
      displaying second media content icons for second media content in a graphical user interface, wherein the graphical user interface comprises a plurality of first media content icons for first media content as selectable elements on a first timeline, wherein the second media content has a non-temporal relationship with the first media content, and wherein the graphical user interface illustrates a temporal proximity of the second media content with the first media content by displaying the second media content icons as selectable elements on a second timeline aligned with the first timeline;
      receiving an interaction with the graphical user interface to identify selected media content from the first and second media content icons that are displayed on the first and second timelines; and
      generating a playlist from the selected media content based on playlist criteria and the non-temporal relationship between the first media content and the second media content.

2. The media device of claim 1, wherein the graphical user interface presents a mapping between a second media content icon and a first media content icon illustrating the non-temporal relationship of the second media content and the first media content, and wherein the processor comprises a plurality of processors operating in a distributed processing environment.

3. The media device of claim 1, wherein the non-temporal relationship is between a first artist of the first media content and a second artist of the second media content.

4. The media device of claim 1, wherein the operations further comprise retrieving playlist content corresponding to the playlist from a media content source, wherein source location information is determined according to first metadata pointers associated with the selected media content.

5. The media device of claim 4, wherein the source location information is further determined according to a profile associated with the media device.

6. The media device of claim 4, wherein the source location information is further determined according to reliability of a source location.

7. The media device of claim 4, wherein the source location information is further determined according to cost of accessing a source location.

8. The media device of claim 1, wherein the interaction comprises receiving an approval of the selected media content.

9. The media device of claim 1, wherein the operations further comprise determining that the selected media content can be presented at the media device.

10. The media device of claim 1, wherein the operations further comprise transmitting the playlist to a second device.

11. A first communication device, comprising:
    a processor; and
    a memory that stores executable instructions that, when executed by the processor, facilitate performance of operations, comprising:
       displaying second media content items for second media content in a graphical user interface, wherein the graphical user interface comprises a plurality of first media content items for first media content as selectable elements on a first timeline, wherein the second media content has a non-temporal relationship with the first media content, and wherein the graphical user interface illustrates a temporal proximity of the second media content with the first media content by displaying the second media content items as selectable elements on a second timeline aligned with the first timeline;
       receiving an interaction with the graphical user interface to identify selected media content from the first and second media content items that are displayed on the first and second timelines; and
       generating a playlist from the selected media content based on playlist criteria and the non-temporal relationship between the first media content and the second media content, wherein the playlist enables receiving the selected media content according to source location information for the selected media content.

12. The first communication device of claim 11, wherein the operations further comprise providing the playlist to a second media device to enable the second media device to access the selected media content via metadata pointers, and wherein the processor comprises a plurality of processors operating in a distributed processing environment.

13. The first communication device of claim 12, wherein the operations further comprise determining that the second media content items can be presented at the second media device.

14. The first communication device of claim 11, wherein the source location information is determined according to metadata pointers.

15. The first communication device of claim 14, wherein a media server retrieves the selected media content from a source location according to the metadata pointers.

16. The first communication device of claim 14, wherein the metadata pointers are embedded in the selected media content.

17. A method, comprising:
displaying, by a system comprising a processor, a plurality of first media content icons for first media content as selectable elements on a first timeline and second media content icons for second media content as selectable elements on a second timeline in a display, wherein the second media content has a non-temporal relationship with the first media content, and wherein a temporal proximity of the second media content with the first media content is illustrated aligning the second timeline with the first timeline;
generating a playlist from selected media content based on playlist criteria and the non-temporal relationship between the first media content and the second media content; and
transmitting, by the system, the playlist to a media device.

18. The method of claim 17, wherein the selected media content comprises media that can be presented by the system.

19. The method of claim 18, further comprising determining, by the system, that the selected media content can be presented by the system.

20. The method of claim 17, wherein the non-temporal relationship is based on user supplied weighting criteria.

\* \* \* \* \*